United States Patent [19]

Stave

[11] 3,871,663

[45] Mar. 18, 1975

[54] RECORD CONTACT SPINDLE

[75] Inventor: Frederick Roland Stave, Oaklandon, Ind.

[73] Assignee: RCA Corporation, New York, N.Y.

[22] Filed: Mar. 12, 1973

[21] Appl. No.: 340,545

[30] Foreign Application Priority Data

Apr. 19, 1972 United Kingdom .............. 18044/72

[52] U.S. Cl. ................................ 274/10 S, 317/2 R

[51] Int. Cl. ........................... G11b 9/06, H05f 3/02

[58] Field of Search .............. 274/10 S, 39 R, 39 A; 317/2 R

[56] References Cited

UNITED STATES PATENTS

| | | | |
|---|---|---|---|
| 1,843,140 | 2/1932 | Mills | 274/39 R |
| 2,744,212 | 3/1956 | Baum | 317/2 R |
| 3,081,383 | 3/1963 | Dimitracaponlos et al. | 274/42 R |
| 3,585,446 | 6/1971 | McKee | 317/2 R |
| 3,767,865 | 10/1973 | Schuller et al. | 274/42 R |

FOREIGN PATENTS OR APPLICATIONS

| | | | |
|---|---|---|---|
| 50,109 | 3/1935 | Denmark | 274/39 R |
| 68,662 | 12/1944 | Norway | 274/10 S |

*Primary Examiner*—Richard E. Aegerter
*Assistant Examiner*—Steven L. Stephan
*Attorney, Agent, or Firm*—E. M. Whitacre; J. B. Hayes; William H. Meagher

[57] ABSTRACT

One type of video disc record reproducing system senses the capacitance between a stylus and the disc record to reconstruct the video information. The stylus includes a thin conductive element electrode and rides on the record, which is rotated at high speeds. The record, which includes a conductive layer covered with a thin dielectric material, is susceptible to accumulating an electric charge. Disposing a pickup device such as a stylus in proximate or contacting relation with such a charged record disc can produce a destructive discharge of the record through the pickup device which results in damage to the stylus. To minimize the occurence of such damage, the disc record is contacted by means which provide a conductive path through the record spindle to a point of reference potential for the system. In one arrangement, the spindle has a slide bar spring biased to be within the periphery of the spindle when the spindle is stationary. Upon rotation of the spindle, the bar extends out of the spindle to contact the record surface. In a further arrangement, a grounding flipper is pivotally mounted in the spindle. The flipper passes through the record hole and is spring biased to bear against the record surface.

12 Claims, 10 Drawing Figures

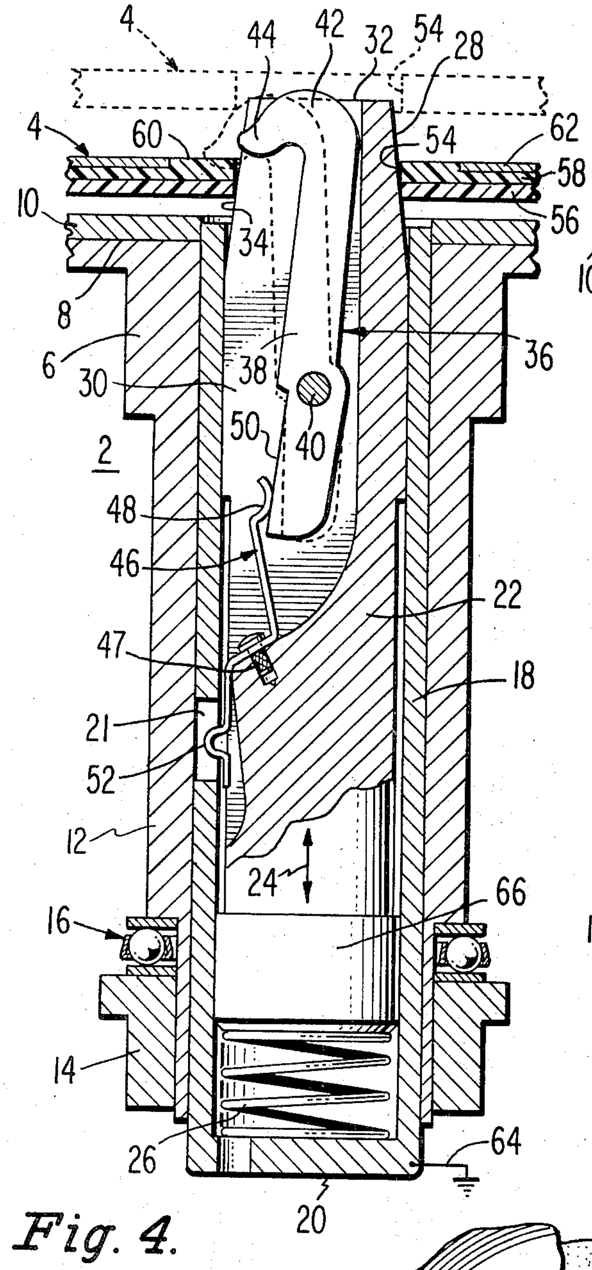
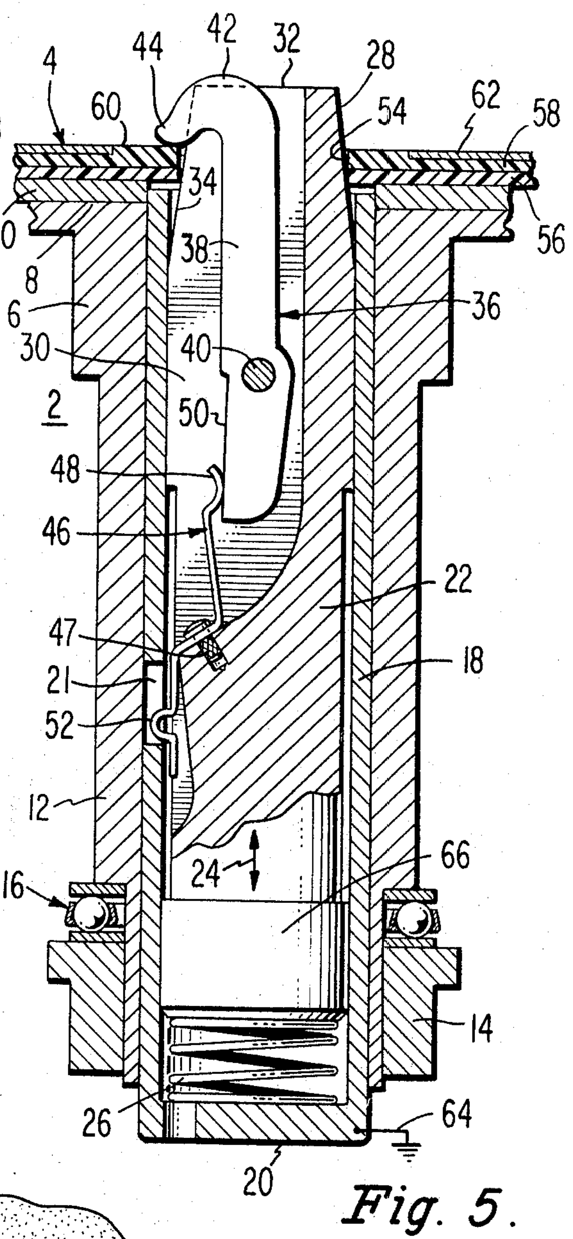
Fig. 4. Fig. 5.
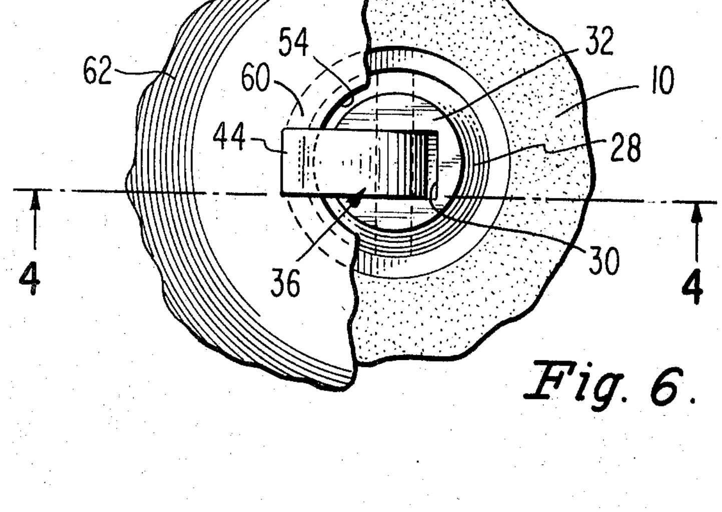
Fig. 6.

RECORD CONTACT SPINDLE

The invention relates to disc type record player systems and more particularly to the provision of electrically coupling a record having a conductive coating through the record spindle member to a point of reference potential.

In certain video disc playback systems, video information is recorded by means of geometric variations in the bottom of a spiral groove on the surface of a disc record. The disc surface includes a conductive material covered with a thin coating of dielectric material. A tracking stylus engages the spiral groove and includes an electrode which cooperates with the conductive material and dielectric coating to form a capacitor. Systems of this type are shown in a U.S. Pat. Application, Ser. No. 126,772, filed Mar. 22, 1971, for Jon Kaufman Clemens and entitled, "Information Records and Recording/Playback Systems Therefor." This application is assigned to RCA Corporation.

In systems of the above-indicated type, as the record is rotated, an edge of the conductive electrode of the stylus, while riding in the disc groove, cooperates with the record to establish capacitive variations due to the geometrical variations in the spiral groove. The capacitor formed by the record and stylus is coupled to a tuned circuit. The resulting capacitive variations are detected to provide output signals as a function of the recorded information.

Disc type records including the type used in variable capacitance playback systems are rotated at relatively high speeds and are susceptible to accumulating an electric charge on them. Such accumulated charge may give rise to potentials on the record as high as hundreds of volts. The accumulation of charge on the record may occur either before or after introduction of the record into the playback system by the user.

The stylus electrode of such an electrostatic video disc type pickup is usually very thin. For example, the electrode thickness may be 4000 A or less. Other types of disc record playback systems may, for example, utilize pressure sensitive, magnetic or ceramic type styli or pickup transducers which are typically also delicate instruments.

Disposing a playback device such as a stylus in proximate or contacting relation with such a charged record disc can produce a discharge of the record through the pickup device. Such discharge results in a current through the pickup device, which may damage or destroy it.

In accordance with the invention, a playback system for a disc record having a conductive coating includes a spindle mounted for rotation with a turntable. An arrangement is provided for establishing a conductive path from a major surface of the disc record through the spindle. There is provided means including a conductive portion which is adapted to cooperate with the major surface of such a record, to provide electrical contact with the record surface. The means is mounted to the spindle so as to engage the major surface of a record when it is disposed on the turntable. And means are coupled to the conductive portion of the first means to provide a conductive path through the spindle to a point of reference potential for the playback system.

A complete understanding of the invention can be obtained from the following detailed description thereof, when taken in conjunction with the accompanying drawings, in which:

FIG. 4 is a vertical section view along line 4—4 of FIG. 6, showing an embodiment of the invention in a first condition.

FIG. 5 is the same vertical section view as FIG. 4, showing the embodiment of FIG. 4 in a further condition.

FIG. 6 is a partial top plan view of the arrangement of the embodiment shown in FIGS. 4 and 5.

Reference is now made to the drawings wherein like reference numerals designate similar elements in various views.

Figure 1:
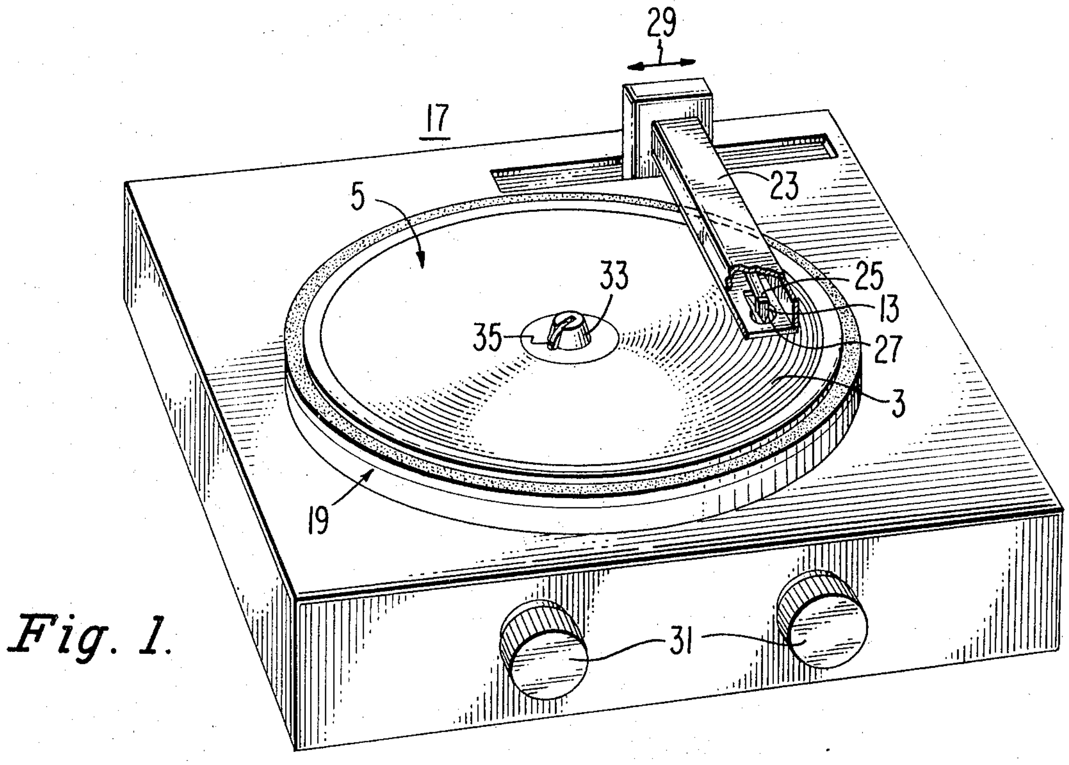
FIG. 1 is a perspective view of one type of video disc record reproducing system for sensing the capacitance between a stylus and the disc record to reconstruct video information.
Figure 2:
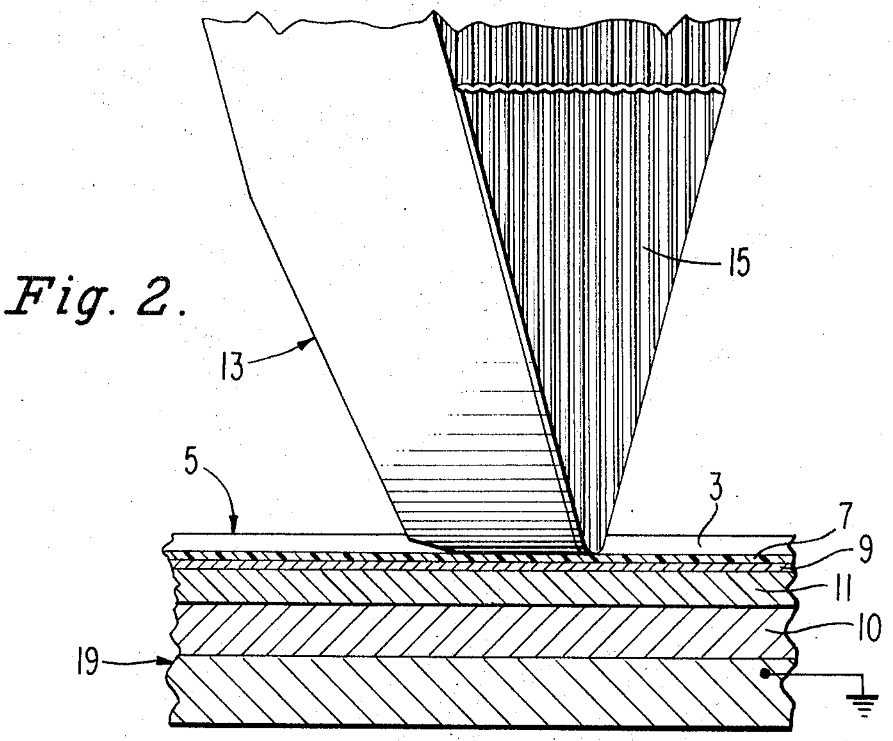
FIG. 2 is a greatly enlarged longitudinal section view of a portion of the grooved record disc of FIG. 1 and a partial perspective view of a tracking stylus of a video disc type playback system.

FIG. 1 shows one type of video disc record reproducing system which senses the capacitance between a stylus and the disc record to reconstruct video information. In video disc playback systems of the type shown, video information is contained in the form of geometric variations in the bottom of a spiral groove 3 on the surface of the disc record 5. As shown more clearly in FIG. 2, the disc record includes a thin dielectric 7 covering a conductive material 9 which is disposed on a dielectric substrate 11. The tracking stylus 13, which engages the spiral groove 3 of the record, supports a conductive electrode 15 cooperating with the conductive material and dielectric coating on the disc record to form a capacitance.

The playback system 17 includes a turntable 19 supporting and rotating the disc record. The turntable is driven by a motor and drive mechanism, not shown in the figure, at a rotational speed such as 450 rpm.

Within the conductive enclosure 23, a conductive stylus support arm 25 is mounted at one end, by means not shown, to allow the stylus arm to move in a lateral as well as a vertical direction during operation. The stylus 13 is secured to the free end of the arm with the stylus electrode 15 electrically coupled to the arm 25. An aperture 27 in the enclosure 23 permits the stylus 13 to pass through the enclosure and contact the disc record. The conductive enclosure 23 with the stylus arm 25 is driven in the direction of arrow 29 to allow the stylus 13 to track the record grooves. This may be accomplished by a drive shaft which is engaged by an engaging mechanism, not shown in the figure, which is coupled to the enclosure 23.

The conductive stylus support arm 25 and surrounding enclosure 23 may form a transmission line for signal coupling between the stylus and signal playback circuitry, which is not shown but is included in the player system 17. The enclosure 23 may house some of the playback circuitry to minimize stray capacitance and electrical interference, by placing the circuitry in close proximity with the pickup stylus 13. The playback circuitry includes an oscillator and tuned circuit which are referenced to a point of reference potential for the playback system. The signal frequency of the oscillator, which may be in the hundreds of megacyle range, is coupled to the transmission line. The transmission line is also coupled to the variable capacitance formed between the stylus electrode 15 and the metalized layer 9 of the disc record 5.

As the video disc record is rotated, the conductive electrode 15 of the stylus cooperates with the record 5 to establish capacitive variations due to the geometrical variations in the bottom of the spiral groove. A return path for the signal capacitance can be provided by the capacitance formed between the conductive layer 9 of the record and the turntable 19. The turntable is made conductive and is connected to a point of reference potential for the playback system, such as ground. The variable signal capacitance provided may be used to vary the resonance of the tuned circuit as excited by the oscillator. The play-back circuitry within the system 17 may include a suitable detector circuit, not shown. Such detector circuitry may convert the resonant changes to an amplitude varying signal. This varying signal may then be processed in a manner appropriate to the signal encoding employed on the disc to derive an output signal.

The mechanical and electrical operating functions of the playback system are controlled through suitable coupling to the control knobs 31, but form no part of the present invention.

As shown in FIG. 1, the playback system has a record centering spindle 33 which includes a member 35 mounted thereto which is capable of establishing electrical contact with the major surface of the disc record adjacent its aperture. A complete discussion of the function and operation of this feature is hereinafter described in detail.

Figure 3:
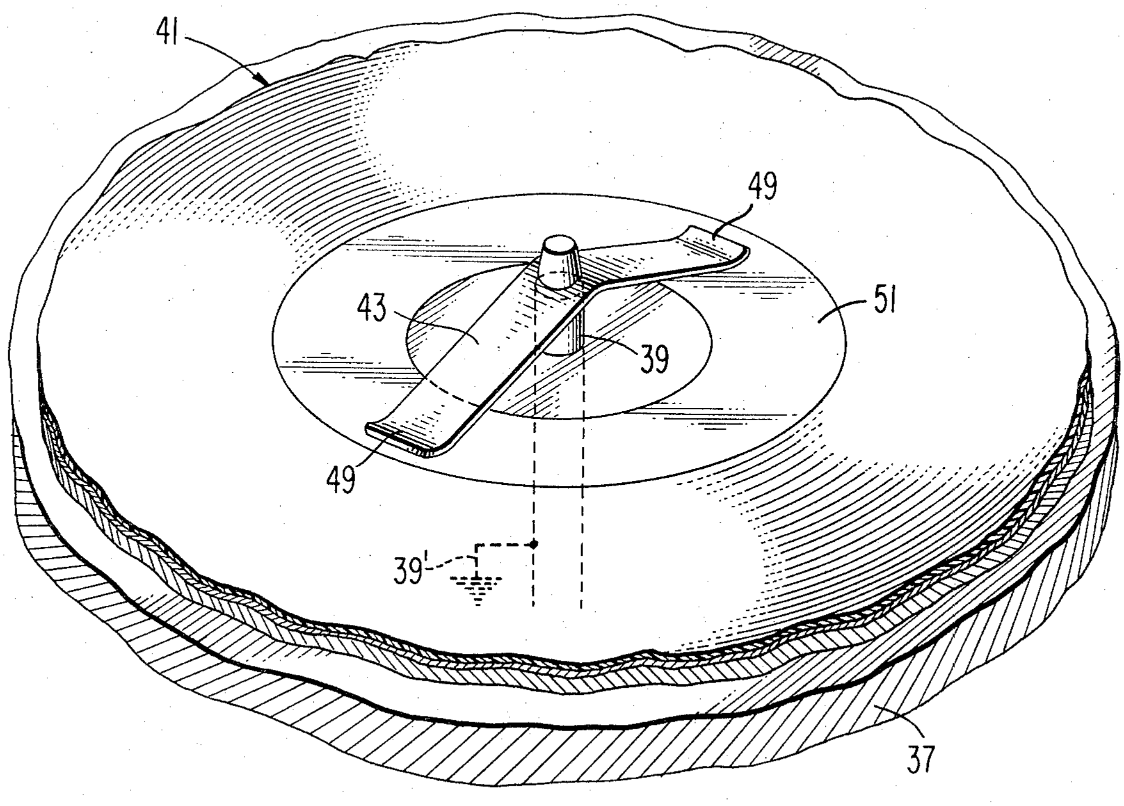
FIG. 3 is a perspective view of a record contacting spindle arrangement in accordance with the invention.

FIG. 3 shows a rotatable turntable 37 including a record centering spindle 39. The spindle preferably has a circular cross section and is formed of a conductive material, such as metal. The lower portion of the spindle 39 passes through the turntable 37 and is mounted for rotation with the turntable, by means not shown in the figure. The lower portion of the spindle is connected to a point of reference potential for the system, which may be, as shown, an electrical ground 39'. A disc record 41 including a conductive layer, such as further described herein, is disposed on the turntable 37.

A resilient strip or band member 43 having the general shape shown in FIG. 3, is disposed about the spindle 39. The band member 43 is formed of a spring steel or other conductive material. The generally U shaped band 43 has a central portion including a circular aperture 45 which is adapted to receive the spindle, when the band is in an unstressed condition. The end portions 49 of the band extend in the direction of the turntable 37 which supports the record disc 41.

In operation the band 43 is positioned along the spindle 39 with end portions 49 contacting a portion 51 of the record major surface through which the conductive layer extends and which surrounds the aperture in the record disc. The position of the band 43 along the spindle is such as to cause the band to flex as the end portions 49 contact the record surface and move radially outward from the unstressed condition of the band. The flexure of the band provides firm contact between the conductive band 43 and record surface 51. This flexure condition causes the central aperture 45 of the band to become non-circular thereby grasping the spindle 39. This maintains the desired contact of the band with the record, as well as providing the desired electrical connection between the conductive band 43 and spindle 39.

Referring to FIGS. 4–6, there is shown a turntable assembly 2 for playing a disc type record 4. The turntable assembly has a portion 6 and includes a generally planar surface 8 and a preferably conductive member 10 adapted to receive and support the record 4. The lower portion of the turntable 2 includes a hollow generally cylindrical neck or sleeve 12. The turntable 2 is mounted for rotation with respect to a fixed supporting frame member 14, by means of a bearing assembly 16. It will be understood that the turntable is coupled to a motor or other suitable means not shown, for providing rotation of the turntable assembly.

A tubular insert 18 having an enclosed lower end 20 is disposed within the sleeve 12 of the turntable 2. The insert 18 is press-fit or in other suitable manner fixed to the sleeve 12 for rotation with the turntable. The insert 18 has an aperture 21 in the periphery thereof, the function of which is hereinafter described.

A generally cylindrical record spindle member 22 is disposed within the insert 18. The spindle member 22 rotates with the insert 18 but is capable of slidable movement within the insert 18 in the direction of arrow 24. A resilient member such as a coil spring 26 supports the spindle member 22 within the insert 18.

The spindle member 22 has a tapered upper portion 28 which is disposed to extend out of the tubular insert 18, to a point beyond the record supporting member portion 10 of the turntable. The spindle member 22 has an internal recess 30, which communicates with the top portion 32 and the peripheral portion 34 of the spindle to form a slot. Disposed within the recess 30 is a generally hooked shaped member 36. The elongated portion 38 of the member 36 is mounted for pivotal movement about a pin 40, secured to the spindle member 22. The curved section 42 of the member 36 is movable into and out of the recess 30 of the spindle 22, and has a portion 44 which extends in the direction of the record supporting member 10.

Within the recess 30 there is a resilient member 46 such as a leaf spring. The resilient member 46 is secured to the spindle member 22 by means of knurled pin or other suitable fastener. A portion 48 of the resilient member 46 cooperates with a surface 50 of the member 36 to provide rotational bias of the member 36 about pin 40. A further portion of the resilient member 46 has a bend therein forming a projection 52. The projection 52 is disposed for movement within the aperture 21, to provide limited movement of the spindle member 22 within the insert 18.

The sequential operation of the embodiment shown in FIGS. 4–6 will now be discussed with respect to the cooperation with the disc record member 4. The record member 4 has a central aperture 54 and may be of the multi-layered type record used in variable capacitance playback systems. As shown, the record member 4 consists of a dielectric substrate 56 beneath a metalized or otherwise conductive layer 58.

The conductive layer 58 preferably includes an exposed portion 60, which surrounds the central aperture 54 for cooperation with the portion 44 of the member 36, with the information bearing grooved portion of the record 4 having a preferably thin dielectric coating 62. In some instances, due to incomplete masking, for example, a thin dielectric coating with a thickness such as a few Angstrom units may result on the portion surrounding the record aperture. It has been found, however, in either situation, that contact of the movable spindle member 36 with the portion of the record adjacent the aperture results in providing a desired protective conductive path between the record and the member 36.

The record member 4 is first disposed, as shown in dash lines in FIG. 4, with the aperture 54 above and aligned with the record spindle 22. The record 4 is then moved in a downward direction over the top portion 32 of the spindle member 22. This downward movement of the record 4 causes the hooked shaped member 36 to be rotated in a clockwise direction, against the action of resilient member 46. This rotation of the member 36 into the recess slot 30, permits passage of the record member 4 downward along the tapered surface 28 of the spindle member 22. The record aperture 54 is dimensioned to allow passage along the peripheral surface 28, such that the record 4 is disposed below the level of the portion 44 of the member 36. In this position of the record the member 36, under the influence of resilient member 46, is rotated in a counterclockwise direction. The counterclockwise rotation of the member 36 causes the portion 44 of the hooked shaped member 36 to move out of the recess slot 30 in the spindle member 22. The action of resilient member 46 urges the hooked shaped portion 44 in the direction downward toward the turntable assembly 2, until contact is established between the hooked shaped portion 44 and the surface 60 of the record member 4.

The weight of the record member 4 bearing on the tapered surface 28 of the record spindle 22 causes the spindle member 22 with the record 4 to move in a downward direction. This downward movement of the record spindle 22 causes the resilient spring member 26 to be compressed, with the record coming to rest in supported manner on the surface 10 of the turntable, as shown in FIG. 5. It will be understood that the stiffness of the resilient spring member 26 is chosen to support the spindle member in the absence of a record in the position shown in FIG. 4, while allowing movement of the spindle member under the influence of the record to dispose the spindle member as shown in FIG. 5.

A conductive path from a major surface of the record member 4 through the spindle 22 to a point of reference potential, such as ground, is therefore established as follows. The member 36 including the portion 44 is formed of a conductive material such as metal. The material of the spindle member proper 22 is also made of conductive material, with the pin 40 serving as a conductive connection between the element 36 and the spindle member 22. The resilient member 46 may also or alternatively be formed of a conductive material thereby providing a conductive connection of the member 46 with the spindle 22. The bottom portion 20 of the insert 18 is electrically coupled to a point of ground potential, shown diagramatically by the symbol 64. The resilient spring member 26 is also made conductive, to complete a path from the end portion 20 of insert 18 to the bottom conductive portion 66 of the spindle 22. The upper portions of the insert 18 which surround the spindle 22 may also be formed of a conductive material, thereby providing a further conductive path to ground.

For removal, the record 4 is moved in an upward direction away from the supporting element 10. This upward record motion causes the member 36 to rotate in a clockwise direction disposing the portion 44 within the recess 30. This retracted position of the member 36 within the spindle permits continued motion of the record 4 along the tapered surface 28 until the record is beyond the spindle 22. Following this, the member 36 is caused to again rotate in a counterclockwise direction under the influence of resilient member 46, thereby causing the end portion 44 to again extend from the recess 30 of the spindle. It will be understood that the resilient member 46 is provided with a spring force sufficient to assure firm contact with the record, yet sufficiently yieldable to permit retraction of the member 36 within the spindle.

Figures 7, 8:
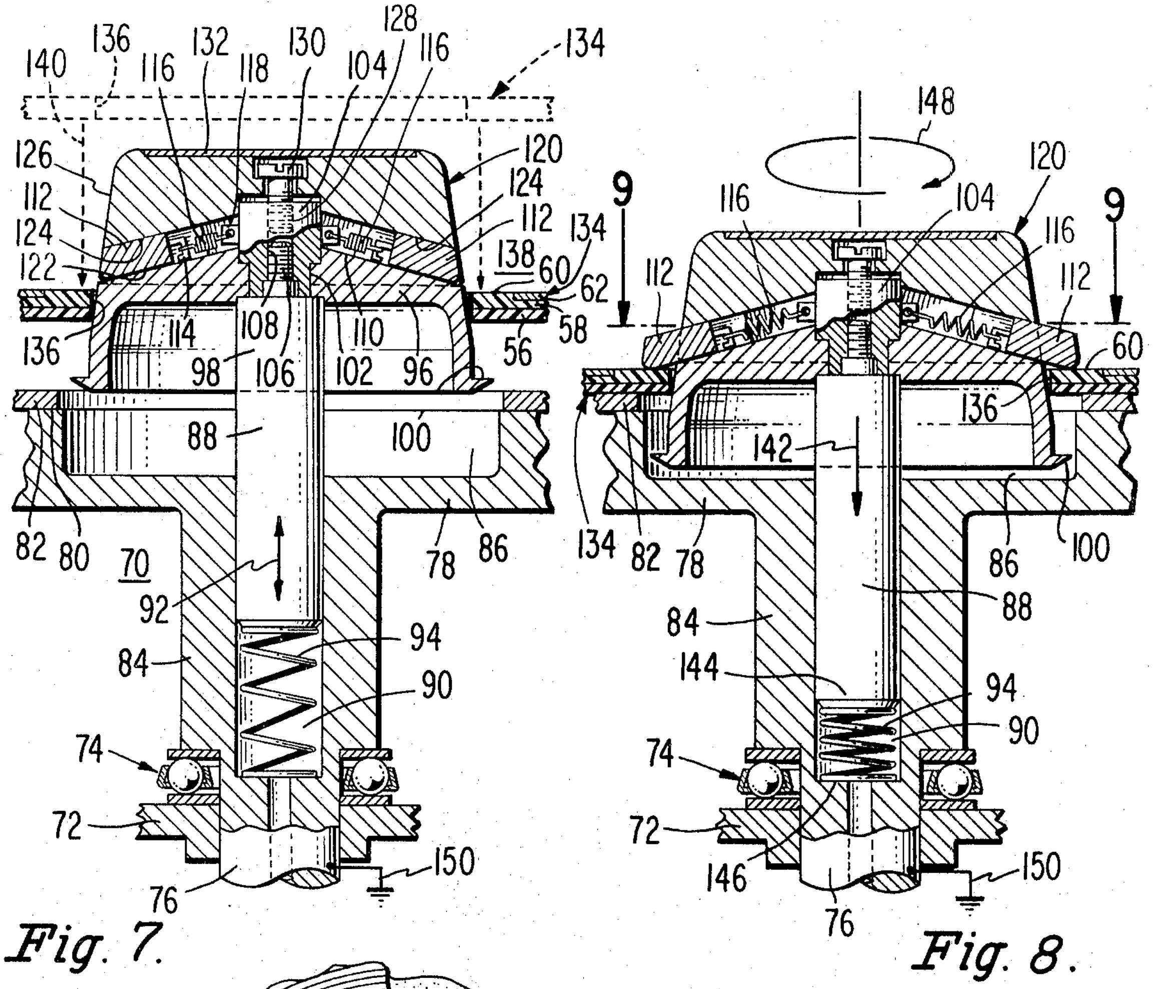
FIG. 7 is a vertical section view along the line 7—7 of FIG. 9, showing a further embodiment of the invention in a first condition.
FIG. 8 is the same vertical view as FIG. 7, showing the embodiment of FIG. 7 in a further condition.
Figure 9:
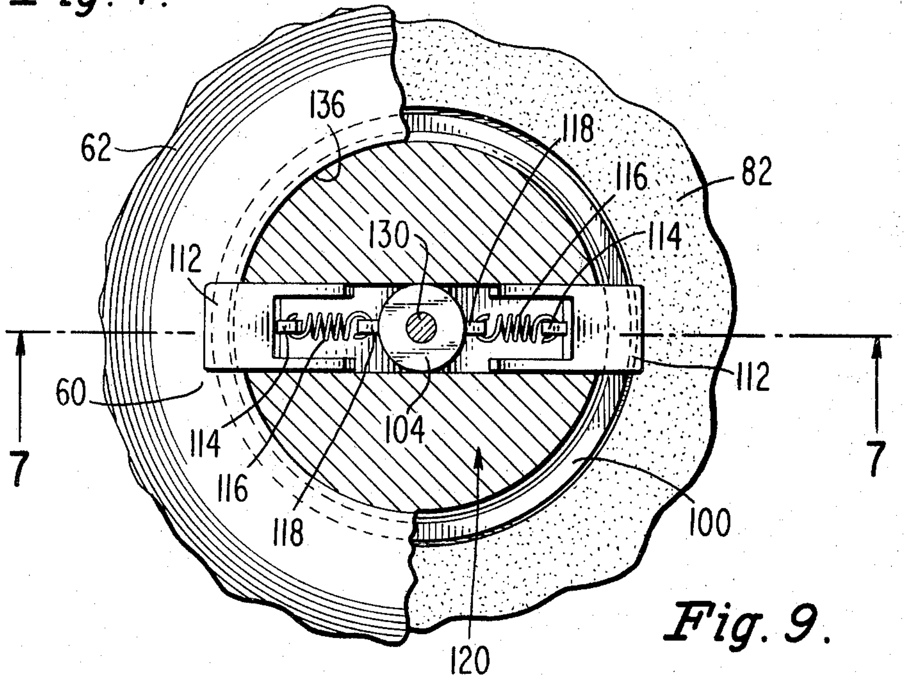
FIG. 9 is a top section view along line 9—9 of FIGS. 7 and 8.
Figure 10:
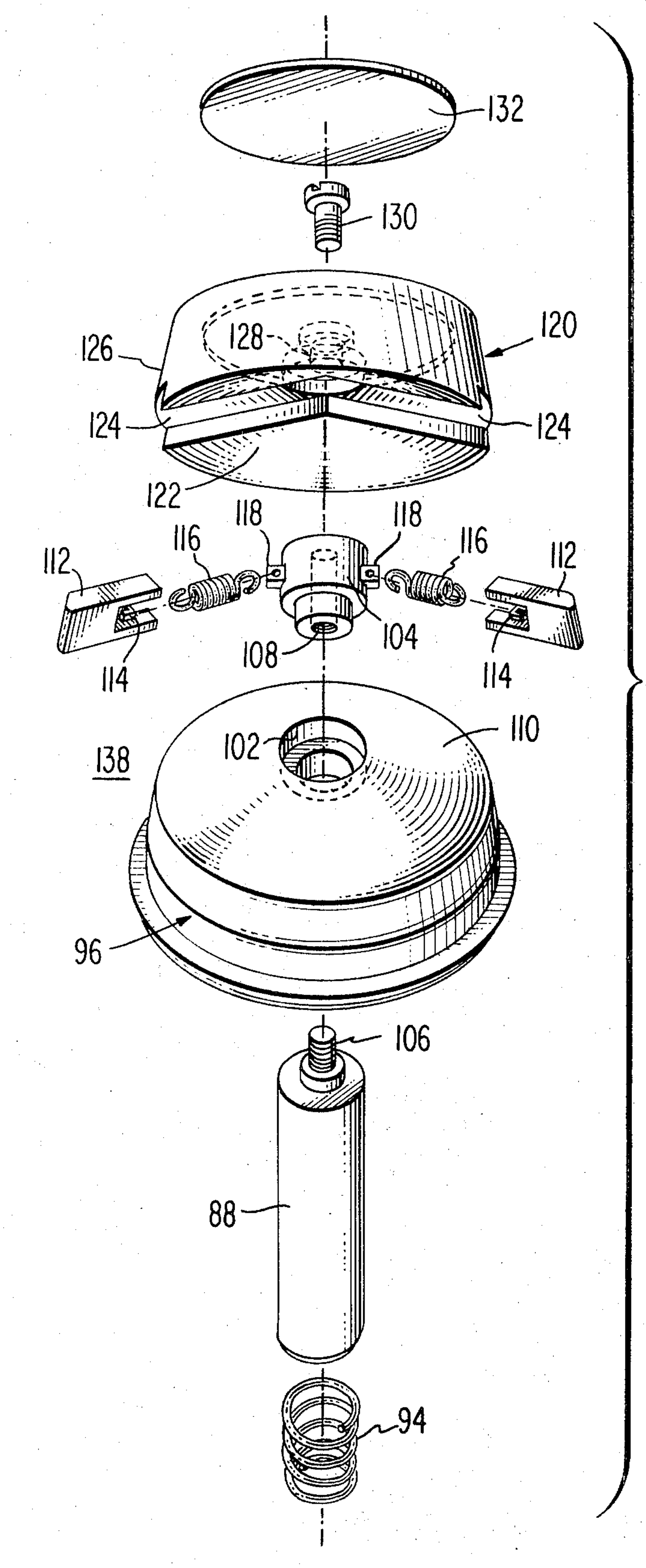
FIG. 10 is an exploded perspective view of the embodiment of FIGS. 7—9.

In FIG. 7 there is shown a turntable assembly 70 which is mounted for rotation with respect to a support frame 72 by means of a bearing 74. It will be understood that rotation of the turntable assembly may be accomplished, by coupling of the lower end portion 76 of the turntable assembly 70 to a motor or other suitable driving means not shown. The upper portion 78 of the turntable assembly includes a generally planar surface 80, preferably conductive, and a traction member 82 for supporting a disc type record. The upper portion 78 is joined to the lower portion 76 of the turntable assembly, by a generally cylindrical hollow sleeve portion 84. The upper portion 78 of the turntable assembly 70 includes a recess or dished out section 86, which surrounds a shaft 88 disposed in the hollow portion 90 of the sleeve 84. The shaft 88 is supported in the hollow 90 by means of a resilient member 94 such as a spring, but is slidably movable in the direction of arrow 92.

An annular generally dome shaped member 96 is supported by the end 98 of the shaft 88. The member 96 has an annularly disposed lower lip 100. In the absence of the influence of the weight of a record, the lip 100 is positioned by spring 94 to be adjacent the upper surface of of the record supporting member 82. The central portion of the member 96 contains a countersunk hole 102, in which is disposed a mounting post member 104. The member 96 is secured to the shaft 88 by means of a threaded stud 106 coupled to the shaft 88, which cooperates with a threaded aperture 108 in the member 104.

The member 96 includes an upper surface 110 which extends radially from the aperture 102, and is sloped in a downward direction toward the record supporting member 82 of the turntable assembly 70. A pair of generally rectangular shaped slide members 112 are disposed for movement along the surface 110 of member 96. Each of the members 112 has a hooked shaped projection 114, to which is attached one end of a spring member 116. The other end of spring member 116 is secured to a tab 118 forming a portion of the member 104. The spring members 116 bias the slide members 112 in a direction towards the mounting post 104.

A further annular member 120 is provided with a concave lower surface 122, which is arranged to cooperate with the surface 110 of member 96. The surface 122 of member 120 has a pair of radially extending channels or slots 124, which communicate with the peripheral surface 126 of the member 120. The channels 124 provide a guideway for the slidable members 112 disposed therein. The member 120 has a central aperture 128 therethrough. A screw element passes through the aperture 128 and engages the threaded hole 108 to secure the member 120 to the mounting post 104. The screw member 130 is enclosed by a lid member 132 which is disposed in a recess formed in the top portion of member 120.

As shown in FIG. 7, the peripheral surface of the annular members 96 and 120 are aligned to form a tapered surface for receiving the aperture of a disc like record. In the embodiment of FIGS. 7–10, a record 134 is utilized which may be structured in the manner described for record member 4 of FIGS. 4–6. However, it will be noted that the record member 134 as shown in FIG. 7 has an aperture 136 which is preferably larger than the aperture 54 of the record member 4 of FIG. 4.

In the operation of the embodiment shown in FIGS. 7–10, the record member 134 is positioned, as shown in dash lines, above the members 120 and 96 which together form a spindle assembly 138. The record 134 is moved in a downward direction as indicated by the arrows 140, with the aperture 136 passing over the tapered surface formed by members 120 and 96. As shown in solid line in FIGS. 7 and 8, the record 134 is positioned below the level of the slidable members 112 disposed in the channels 124 of member 120. It will be understood that for initially positioning the record on the spindle assembly 138, the turntable 70 and spindle assembly 138 are disposed in a stationary condition.

The weight of the record member 134 on the spindle assembly 138 causes the downward movement of the shaft 88 and spindle assembly 138 in a direction of arrow 142. The lower portion 144 of shaft 88 causes the spring member 94 to be compressed against the surface 146 of the lower portion 76 of member 84. The movement of shaft 88 allows the record member 134 to assume a position supported by the member 82 of turntable assembly 70, as shown in FIG. 8.

The turntable assembly 70 is now caused to rotate, for example, in the direction of arrow 148. The spindle assembly 138 which is disposed in the turntable assembly is caused to also rotate in the direction shown by the arrow 148. The rotation of the spindle assembly 138 causes a centrifugal force to be developed on the slidable members 112. Under the influence of this centrifugal force, the slide members 112 move in a radially outward direction through the channels 124 of member 120. Movement of the members 112 causes them to project or extend beyond the peripheral surface of the spindle assembly 138, as shown in FIG. 8. The members 112 move along the downwardly sloping surface 110 of member 96 in a direction toward the turntable 70, until firm contact is established between the members 112 and a major surface of the record 134.

The movement of the members 112 is against the force of spring members 116. It will be understood that the spring force of members 116 is made such as to assure positioning of the members 112 within the periphery of the spindle assembly 138, when the assembly is stationary. However, the spring force of the members 116 is sufficiently yieldable to allow the members 112 to move radially outward under the influence of centrifugal force, as the spindle assembly 138 is rotated.

To provide a conductive path from the major surface of the record 134 through the spindle, at least the lower portion 76 including surface 146 is formed of a conductive material. The portion 76, as shown diagramatically in FIGS. 7 and 8, is coupled to a point of reference potential for the playback system, such as ground. This may be accomplished in suitable known manner. To complete a path from a major surface of the record 134, the slidable members 112, spring members 116, mounting post 104, shaft member 88 and resilient member 94 are formed of a conductive material. Alternatively, some or all of the justmentioned members may be in part formed of a non-conductive material, such as plastic. In such instance the members are made to include interconnected conductive portions forming a continuous path between the tip portion 152 of members 112 and the point of ground potential 150.

I claim:

1. A playback system for disc records of the type having a centrally apertured major surface comprising exposed conductive material in the vicinity of the aperture and susceptible to accumulating an electric charge of sufficient magnitude to damage a pickup device for transducing said record comprising: a rotatable turntable and a record centering spindle mounted for rotation with said rotatable turntable, a conductive member mounted in said spindle for movement between (1) a first position sufficiently withdrawn within said spindle to permit record passage to a playback position centered about said spindle and supported by said turntable, and (2) a second position extending sufficiently from said spindle to permit electrical contact between said member and the exposed conductive material of a major surface of a record when said record is disposed in said playback position with said turntable in supporting contact with a surface of said record opposite to said major surface, and means coupling said conductive member through said spindle to a point of reference potential for said playback system.

2. The invention according to claim 1, wherein; said spindle has a recess therein, and said conductive member has a generally hooked shaped section formed at an end thereof, and wherein said playback system also includes means in said recess for pivotally mounting said conductive member to said spindle with said hooked shaped section extending out of said spindle and toward said turntable and resilient means coupled to said member for urging rotation of said hooked shaped section into contacting relation with a record when disposed on said turntable in said playback position.

3. In a playback system for recovering signals recorded in a grooved portion of a major surface of a disc type record, said major surface also including an ungrooved conductive region surrounding a central aperture in said disc record; said playback system including a rotatable turntable comprising conductive material and in supporting contact with a surface of said record opposed to said major surface when said record is in position for playback of said signals, and a spindle member mounted for rotation with said turntable and subject to protrusion through said record aperture when said record is in said playback position; apparatus comprising:

first means including a conductive portion adapted to cooperate with said conductive region of said major surface of such a record to establish a conductive contacting relation therewith, means mounting said first means to said spindle member for movement between a first position when said spindle member is non-rotational and a second position in response to rotational motion of said spindle member, said first means in said first position being disposed in in a manner precluding record contact, said first means in said second position causing said conductive portion to engage said conductive region of said major surface of a record when said record is disposed on said turntable in said playback position, and means coupled to the conductive portion of said first means for providing a conductive path through said spindle member to said turntable.

4. The invention according to claim 3 and further including means for spring biasing said first means toward said first position.

5. The invention according to claim 3, wherein; said first means in said first position is disposed within a boundary defined by the projection of the periphery of said aperture in said record when said record is in said playback position.

6. In a playback system for use with a disc type record having a major surface including effectively exposed conductive material in a region thereof, said system including means for recovering recorded signals from said major surface of such a disc type record when such a record is disposed about a peripheral surface of a record spindle member in a playback position with a surface of such record opposed to said major surface resting upon a rotatable turntable, said record spindle member being mounted for rotation with said rotatable turntable; apparatus comprising:

first means including a conductive portion adapted to cooperate with said major surface of such a record in said region thereof to establish a conductive contacting relation with said conductive material, means mounting said first means to said record spindle member for movement between a first position and a second position in response to rotational motion of said spindle member, said first means occupying said first position in the absence of rotational motion of said spindle member and said first means in said first position being disposed within said peripheral surface of said record spindle, said first means assuming said second position during rotational motion of said spindle member, and said first means in said second position protruding beyond the peripheral surface of said spindle an amount sufficient to cause said conductive portion to engage said region of said major surface of such a record when disposed on said turntable in said playback position, and means coupled to the conductive portion of said first means for providing a conductive path through said spindle to a point of reference potential for said playback system.

7. The invention according to claim 6, wherein; said mounting for said first means includes means permitting translational movement of said first means in a direction angled toward said turntable in response to rotational motion of said spindle member.

8. In a system for playing back signals from a major surface portion of a disc type record which is disposed about a peripheral surface of a record spindle member, said record spindle member being mounted for rotation with a rotatable turntable adapted to support said record, and said major surface of said record including effectively exposed conductive material in a region thereof, apparatus comprising:

first means including a conductive portion adapted to cooperate with a major surface of the record in said region to establish a conductive contacting relation with said conductive material;

means mounting said first means to said record spindle member for movement between a first position when said spindle member is non-rotational and a second position in response to rotational motion of said spindle member;

said first means in said first position being disposed within said peripheral surface of said record spindle;

said first means in said second position protruding beyond the peripheral surface of said spindle an amount to cause said conductive portion to engage said region of the major surface of a record disposed on said turntable; means coupled to the conductive portion of said first means for providing a conductive path through said spindle;

wherein said spindle member includes a channel communicating with the peripheral surface of said spindle member, and said first means comprises a slidable member disposed in said channel for movement therealong, and resilient means coupled to said slidable member are provided to bias said first means in said first position.

9. The invention according to claim 8, wherein: said channel is angled in a given direction toward said turntable, and said slidable member is movable in response to the rotation of said spindle along said channel in said given direction to cause a force to be exerted through said conductive portion on the record when present on said turntable.

10. The invention according to claim 8, wherein: at least a portion of the supportive structure of said spindle member is formed of a conductive material, said slidable member includes conductive material serving as said conductive portion of said first means, and said resilient means comprises metallic spring means interconnecting said conductive material of said slidable member with said conductive material of said supportive structure of said spindle member.

11. A video disc playback system comprising, in combination:

a centrally apertured disc of dielectric material having a major surface including a central ungrooved region adjacent the disc aperture, and an additional region surrounding said central region and impressed with a spiral groove, the bottom of said groove containing geometric variations representative of recorded video signal information;

a layer of conductive material covering said dielectric material of said disc in both said central ungrooved region and said surrounding grooved region of said major surface;

a layer of dielectric material overlying only a portion of said conductive layer, said portion being inclusive of the conductive material covering said grooved region but exclusive of the segment of said conductive material covering said ungrooved region in the immediate vicinity of said aperture;

pickup means including a stylus subject to reception in said groove, for recovering said recorded video signal information;

a conductive turntable for supporting said record and subject to rotation at a desired playback speed;

a spindle mounted for rotation with said turntable;

a conductive member supported in said spindle and subject to translational movements between first and second positions, said conductive member occupying said first position in the absence of rotational motion of said spindle member and assuming said second position in response to centrifugal force exerted thereon as a consequence of rotation of said spindle at said playback speed;

said conductive member in said first position being located sufficiently close to the center of said spindle to preclude interference by said conductive member with passage of said record to a playback position in which said ungrooved region of said major surface surrounds said spindle, the grooved region of said major surface is accessible to said pickup means, and the surface of said record opposed to said major surface is in contact with said turntable;

said conductive member in said second position protruding from said spindle in the direction of said turntable to a sufficient degree to ensure electrical contact between said conductive member and the conductive material of said layer segment during rotation of said record in said playback position at said playback speed;

means for spring biasing said conductive member toward said first position, wherein the strength of said biasing is insufficient, relative to the magnitude of said centrifugal force at said playback speed, to prevent movement of said conductive member to said second position upon attainment of said playback speed, but is sufficient to substantially ensure return of said conductive member to said first position upon a cessation of the rotational motion of said spindle; and conductive means connected between said conductive member and said conductive turntable so that the capacitance exhibited between said conductive turntable and said conductive layer when said record is in said playback position is shunted by a conductive path comprising said conductive member and said conductive means upon record rotation at said playback speed.

12. Apparatus in accordance with claim 11 wherein said spring biasing means additionally serves as a portion of said conductive means.

* * * * *